(12) United States Patent
Shima

(10) Patent No.: US 10,502,319 B2
(45) Date of Patent: Dec. 10, 2019

(54) PISTON RING AND ITS PRODUCTION METHOD

(71) Applicant: KABUSHIKI KAISHA RIKEN, Tokyo (JP)

(72) Inventor: Yuji Shima, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 49 days.

(21) Appl. No.: 15/744,609

(22) PCT Filed: Jul. 14, 2016

(86) PCT No.: PCT/JP2016/070809
§ 371 (c)(1),
(2) Date: Jan. 12, 2018

(87) PCT Pub. No.: WO2017/014139
PCT Pub. Date: Jan. 26, 2017

(65) Prior Publication Data
US 2018/0209541 A1    Jul. 26, 2018

(30) Foreign Application Priority Data
Jul. 17, 2015    (JP) .................... 2015-142692

(51) Int. Cl.
*F16J 9/22* (2006.01)
*F16J 9/26* (2006.01)
(Continued)

(52) U.S. Cl.
CPC .............. *F16J 9/22* (2013.01); *C23C 8/26* (2013.01); *C23C 8/38* (2013.01); *C23C 8/50* (2013.01);
(Continued)

(58) Field of Classification Search
CPC ..... F16J 9/22; F16J 9/26; C23C 28/04; C23C 8/80; C23C 8/26; C23C 22/22;
(Continued)

(56) References Cited

U.S. PATENT DOCUMENTS 4,966,751 A * 10/1990 Kaede .................... C22C 38/18
148/318
6,209,881 B1 * 4/2001 Michel ..................... F16J 9/26
277/440
(Continued)

FOREIGN PATENT DOCUMENTS

EP    2 520 833 A2    11/2012
EP    3 098 485 A1    11/2016
(Continued)

OTHER PUBLICATIONS

[NPL-1] Shima et al. (JP 2015-057516 A); Mar. 2015 (JPP—machine translation to English). (Year: 2015).*
(Continued)

*Primary Examiner* — David Sample
*Assistant Examiner* — Donald M Flores, Jr.
(74) *Attorney, Agent, or Firm* — Birch, Stewart, Kolasch & Birch, LLP

(57) ABSTRACT

To provide a piston ring free from microwelding to a piston while exhibiting excellent wear resistance in side surfaces, for a long period of use in a high-temperature, high-pressure environment, and its production method, a nitride layer is formed on at least one of upper and lower side surfaces of the piston ring, and then subjected to a phosphate chemical conversion treatment, such that the nitride layer has at least one of granular and vermicular surface forms.

13 Claims, 3 Drawing Sheets

(51) Int. Cl.

| | |
|---|---|
| *F02F 5/00* | (2006.01) |
| *C23C 8/38* | (2006.01) |
| *C23C 8/50* | (2006.01) |
| *C23C 22/22* | (2006.01) |
| *C23C 8/26* | (2006.01) |
| *C23C 8/80* | (2006.01) |
| *C23C 28/04* | (2006.01) |
| *C22C 21/02* | (2006.01) |
| *C22C 38/00* | (2006.01) |
| *C22C 38/02* | (2006.01) |
| *C22C 38/04* | (2006.01) |
| *C23C 22/78* | (2006.01) |
| *C23C 30/00* | (2006.01) |
| *F02F 1/20* | (2006.01) |

(52) U.S. Cl.
CPC ............... *C23C 8/80* (2013.01); *C23C 22/22* (2013.01); *C23C 28/04* (2013.01); *F02F 5/00* (2013.01); *F16J 9/26* (2013.01); *C22C 21/02* (2013.01); *C22C 38/001* (2013.01); *C22C 38/002* (2013.01); *C22C 38/02* (2013.01); *C22C 38/04* (2013.01); *C23C 22/78* (2013.01); *C23C 30/00* (2013.01); *F02F 1/20* (2013.01)

(58) Field of Classification Search
CPC .. C23C 8/38; C23C 8/50; C23C 30/00; C23C 22/78; F02F 5/00; F02F 1/20; C22C 38/002; C22C 21/02; C22C 38/001; C22C 38/02; C22C 38/04
See application file for complete search history.

(56) References Cited

U.S. PATENT DOCUMENTS

| | | | | |
|---|---|---|---|---|
| 7,572,344 B2* | 8/2009 | Maier | ................... | C23C 14/024 148/217 |
| 2005/0269787 A1 | 12/2005 | Muramatsu et al. | | |
| 2007/0187002 A1* | 8/2007 | Takahashi | ............. | C21D 8/065 148/318 |
| 2010/0319647 A1 | 12/2010 | Ogawa et al. | | |
| 2013/0049304 A1 | 2/2013 | Marques et al. | | |
| 2016/0215882 A1 | 7/2016 | Shima et al. | | |
| 2017/0009314 A1 | 1/2017 | Shima | | |

FOREIGN PATENT DOCUMENTS

| | | | | |
|---|---|---|---|---|
| JP | 60-82552 U | | 6/1985 | |
| JP | 1-307568 A | | 12/1989 | |
| JP | 5-78856 A | | 3/1993 | |
| JP | 05078856 A | * | 3/1993 | |
| JP | 10-339370 A | | 12/1998 | |
| JP | 2000-2333 A | | 1/2000 | |
| JP | 2000-144376 A | | 5/2000 | |
| JP | 2004-68815 A | | 3/2004 | |
| JP | 2007-162574 A | | 6/2007 | |
| JP | 2008-241032 A | | 10/2008 | |
| JP | 2012-149765 A | | 8/2012 | |
| JP | 2015-57516 A | | 3/2015 | |
| JP | 2015057516 A | * | 3/2015 | ............. C22C 38/00 |
| WO | WO 2009/069703 A1 | | 6/2009 | |

OTHER PUBLICATIONS

[NPL-2] Osaki et al. (JP H05-078856 A); Mar. 1993 (JPP—machine translation to English). (Year: 1993).*
Extended European Search Report dated Mar. 7, 2019, in European Patent Application No. 16827699.6.
International Search Report issued in PCT/JP2016/070809 (PCT/ISA/210), dated Aug. 16, 2016.
Notificiation of Reasons for Refusal for Japanese Application No. 2015-142692, dated Dec. 6, 2016.
Writtem Opinion of the International Searching Authority issued in PCT/JP2016/070809 (PCT/ISA/237), dated Aug. 16, 2016.

* cited by examiner

PISTON RING AND ITS PRODUCTION METHOD

FIELD OF THE INVENTION

The present invention relates to a piston ring for internal engines, particularly to a piston ring having excellent wear resistance on its side surface, and its production method.

BACKGROUND OF THE INVENTION

In internal engines, technical improvements for higher power, higher durability, higher fuel efficiency, etc. are required. Technical improvement for higher power results in higher temperature and pressure in engines. Particularly, top rings used in a high-temperature, high-pressure environment are strongly required to have high wear resistance on peripheral sliding surfaces and side surfaces.

The wear resistance of piston ring side surfaces has a close relation to microwelding occurring when combined with an aluminum piston. Patent Reference 1 discloses a piston ring having a phosphate or triiron tetraoxide coating formed as a primer coating on at least a lower surface, and a solid-lubricant-containing, heat-resistant, wear-resistant resin coating formed on the primer coating to prevent microwelding to the side surfaces. It is described that the above primer coating is formed to increase the adhesion of the resin coating. Patent Reference 2 points out that the primer coating of phosphate or triiron tetraoxide disclosed in Patent Reference 1 deteriorates the fatigue strength of the piston ring, disclosing a piston ring having a nitride layer in place of the phosphate or triiron tetraoxide coating, and a solid-lubricant-containing, heat-resistant, wear-resistant resin coating formed on the nitride layer.

With respect to a heat-resistant, wear-resistant resin coating containing a solid lubricant, Patent References 1 and 2 disclose the use of tetrafluoroethylene resins, oxybenzoyl polyester resins and polyamideimide resins, and Patent Reference 3 discloses the use of polyamideimide-silicon dioxide hybrid materials and polyimide-silicon dioxide hybrid materials.

Patent Reference 4 discloses a hard carbon coating containing 0.5 atomic % or more and less than 5.0 atomic % of one or more elements selected from the group consisting of Si, Cr and Ti for exhibiting excellent resistance to microwelding of a piston ring to a piston, in place of the lubricant-containing, heat-resistant, wear-resistant resin coating.

However, the above resin coating has absolutely low wear resistance, failing to exhibit microwelding resistance for a long period of time, though it is effective to prevent initial microwelding. Also, the hard carbon coating cannot always be put into practical use in any situation in view of the cost, despite longer life than the resin coating.

In view of the above technical background, a nitride layer is generally formed on piston ring side surfaces to secure wear resistance. For this purpose, martensitic stainless steels containing large amounts of nitride-forming elements for easy formation of the nitride layer, such as SUS440B (17% Cr) and SUS420J2 (13% Cr), are conveniently used, but low-alloy steels such as silicon-chromium steels are not usable because of insufficient nitridability.

PRIOR ART REFERENCES

Patent Reference 1: JUM 60-82552 A
Patent Reference 2: JP 1-307568 A
Patent Reference 3: JP 2004-68815 A
Patent Reference 4: JP 2007-162574 A

OBJECT OF THE INVENTION

An object of the present invention is to provide a piston ring capable of preventing microwelding for a long period of time even when used in a high-temperature, high-pressure environment, thereby exhibiting excellent wear resistance on side surfaces, and its production method.

DISCLOSURE OF THE INVENTION

Paying attention to the fact that when a phosphate chemical conversion coating is formed on a piston ring, Fe is locally eluted by the etching reaction of steel with phosphate ions, the inventor has conducted intensive research, finding that a matrix of the piston ring, on which the phosphate chemical conversion coating is formed, has a surface form (shape) having sizes and depths suitable for oil reservoirs needed in slidable side surface portions, and that with such rough surface constituted by a nitride layer having desired hardness and residual compression stress, the piston ring can have improved fatigue strength, while preventing microwelding of a piston ring to a piston for a long period of time.

Thus, the piston ring of the present invention is a steel-made piston ring having a nitride layer formed on at least one of upper and lower side surfaces, the nitride layer having at least one of granular and vermicular surface forms. The diameters of the granular surface forms and the short diameters of the vermicular surface forms are preferably in a range of 3-40 μm on average. A surface roughness curve of the nitride layer preferably has the maximum height Rz (JIS B0601-2001) of 2.5-6 μm.

Of course, a phosphate chemical conversion coating may be formed on the nitride layer. The phosphate chemical conversion coating is preferably a zinc calcium phosphate coating.

The matrix of the piston ring, on which the nitride layer is formed, is preferably a steel comprising C, Si, Mn and Cr as indispensable alloy elements, and Mo, V and B as optional alloy elements; the composition of the indispensable alloy elements comprising by mass 0.45-0.65% of C, 0.15-0.35% of Si, 0.65-1.00% of Mn, and 0.60-1.10% of Cr; the composition of the optional alloy elements comprising by mass less than 0.35% of Mo, less than 0.25% of V, and less than 0.001% of B; and the total amount of the indispensable alloy elements and the optional alloy elements being less than 3.0% by mass.

The nitride layer preferably has hardness of 700 HV0.05 or more in a range from the outermost surface to the depth of 30 μm, with a hardness reduction ratio of 3 HV0.05/μm or less in a depth direction.

The hardness of the matrix is preferably 90-100% of the hardness before nitriding.

The method of the present invention for producing a piston ring is characterized by nitriding at least one of upper and lower side surfaces of the piston ring formed by a steel wire, and then conducting a phosphate chemical conversion treatment. The phosphate chemical conversion treatment is preferably a zinc calcium phosphate treatment. The zinc calcium phosphate treatment is preferably conducted under the conditions of a treatment temperature of 75-95° C. and total acidity of 30-55 points.

Effects of the Invention

Because the piston ring of the present invention has a hard nitride layer formed on side surfaces, and is further subjected to a phosphate chemical conversion treatment, it has a surface form having suitable sizes and depths for oil reservoirs in slidable side surface portions even after the phosphate chemical conversion coating is worn off, resulting in an excellent lubricating function which prevents microwelding. This hard nitride layer having an excellent lubricating function exhibits excellent wear resistance with fatigue strength maintained, so that the wearing of side surfaces, which causes microwelding, can be suppressed for a long period of time.

DESCRIPTION OF THE PREFERRED EMBODIMENTS

The piston ring of the present invention is a steel-made piston ring having a nitride layer formed on at least one of upper and lower side surfaces, the nitride layer having at least one of granular and vermicular surface forms. Granular and/or vermicular surface forms having predetermined sizes are formed by the local elution of Fe from a nitride-diffused layer by an etching reaction, the formation of phosphate crystal nuclei, and phosphate crystal growth in the phosphate chemical conversion treatment, depending on the structures and sizes of phosphate crystals formed on the surface. Depending on the type of phosphate, treatment conditions, etc., the crystal structure may be acicular, foliate, columnar, flaky, granular, etc. The nitride-diffused layer formed in the matrix immediately under the phosphate chemical conversion coating has granular and/or vermicular surface forms.

Figure 1:
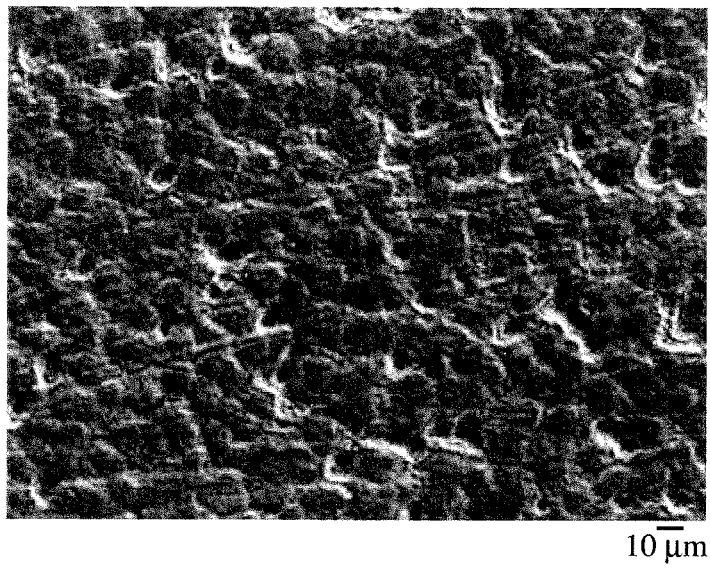
FIG. 1 is a photograph showing a side surface form of the piston ring of Example 1 after the engine test.
Figure 2:
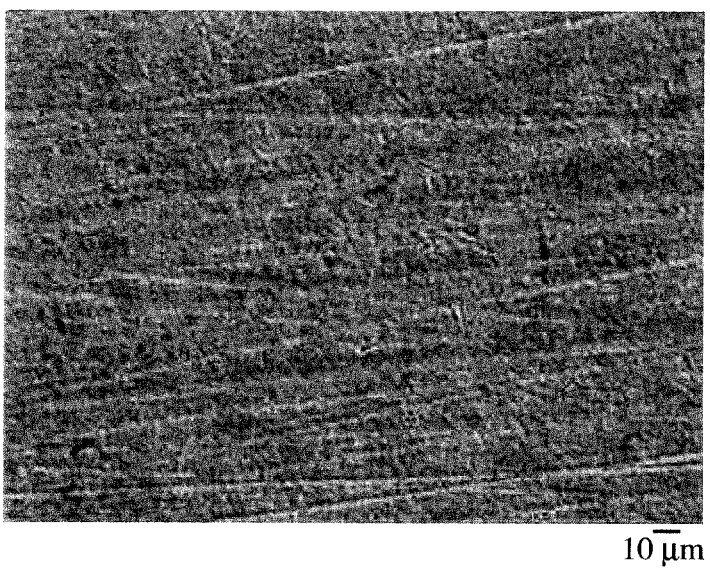
FIG. 2 is a photograph showing a side surface form of the piston ring of Comparative Example 1 after the engine test.
Figure 3:
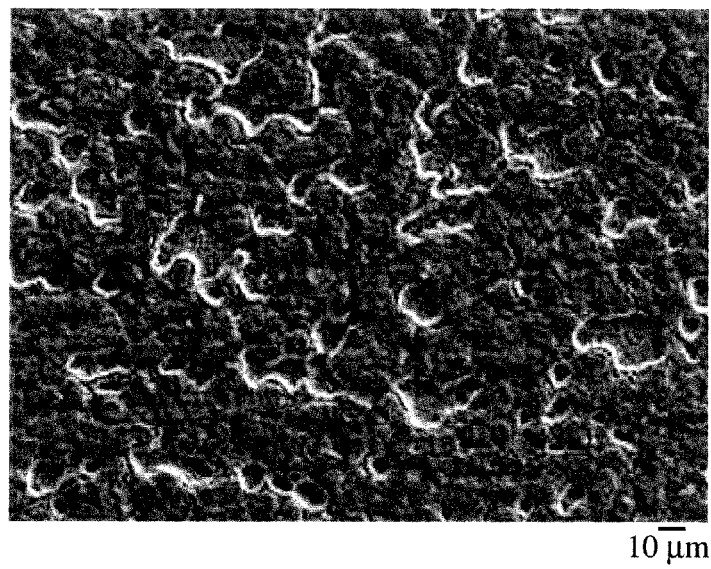
FIG. 3 is a photograph showing a side surface form of the piston ring of Comparative Example 2 after the engine test.
Figure 4:
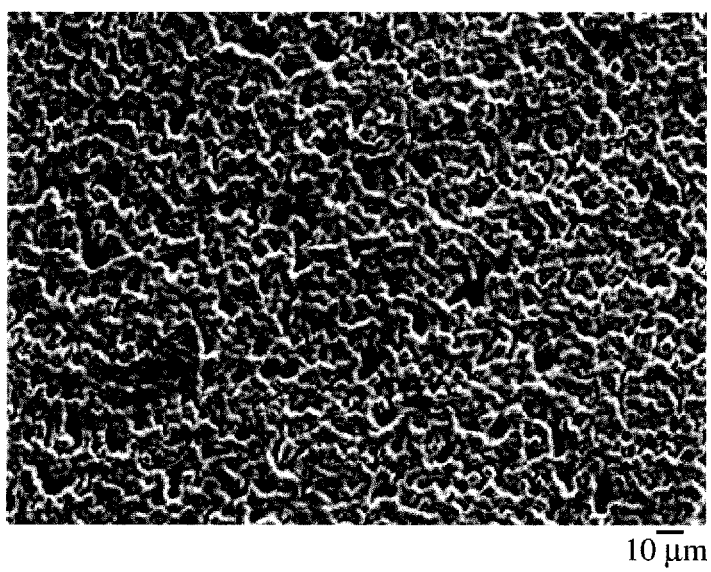
FIG. 4 is a photograph showing a side surface form of the piston ring of Example 5 after the engine test.
Figure 5:
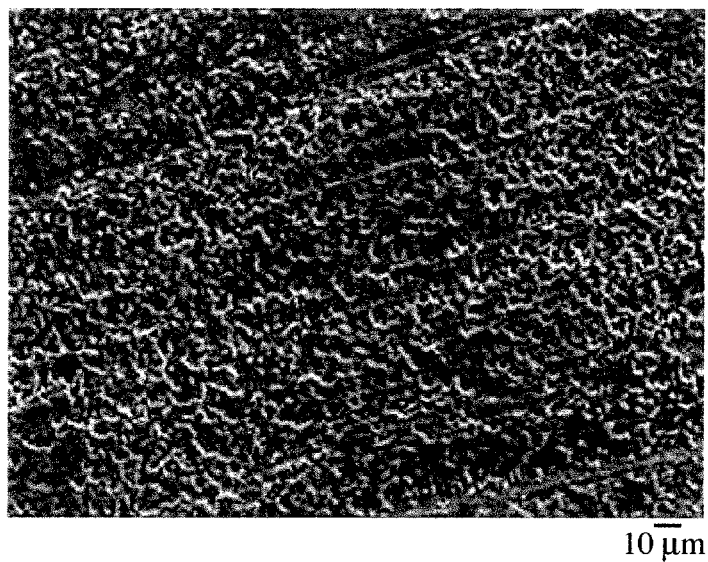
FIG. 5 is a photograph showing a side surface form of the piston ring of Comparative Example 4 after the engine test.

FIGS. 1-5 are photographs showing side surface forms of the piston rings of Examples and Comparative Examples after the engine test described later. FIG. 2 shows a relatively smooth side surface of the piston ring provided with only a nitride layer without a phosphate chemical conversion treatment. FIGS. 1 and 3-5 show the side surfaces of the piston rings subjected to the phosphate chemical conversion treatment, in a state where the phosphate crystal coating has been worn out in an initial stage of the engine test. The nitride-diffused layers in FIGS. 1, 4 and 5 have granular and/or vermicular surface forms. FIG. 3 shows a similar surface form to that of FIG. 1, which is obtained by the phosphate chemical conversion treatment without nitriding. FIGS. 4 and 5 show surface forms in which the granular and/or vermicular surface forms in FIG. 1 or 3 are made finer.

Because vermicular surface forms may be regarded as connected granular surface forms, the short diameters of vermicular surface forms correspond to the diameters of granular surface forms. The diameters of granular surface forms and the short diameters of vermicular surface forms are preferably in a range of 3-40 μm, more preferably in a range of 5-35 μm, further preferably in a range of 10-35 μm, on average. The roughness of granular and/or vermicular surface forms preferably has the maximum height Rz (JIS B0601-2001) of 2.5-6 μm in a surface roughness curve. The Rz is more preferably 2.5-5.5 μm, further preferably 2.5-5.0 μm.

In the piston ring of the present invention characterized by the surface form (roughness) of the nitride layer on the side surfaces, it is preferable that a phosphate chemical conversion coating is formed on the nitride layer by a chemical conversion treatment for providing such surface form, and that the phosphate chemical conversion coating remains on the nitride layer when used. The phosphate chemical conversion coating acts as a conforming layer, securing initial gas tightness of the side surfaces.

The phosphate chemical conversion treatment conducted on the piston ring uses zinc phosphate, zinc calcium phosphate, manganese phosphate, etc. Taking into consideration the sizes of the above surface form, the phosphate chemical conversion coating of the present invention is preferably a calcium phosphate coating.

From the economic aspect, the piston ring of the present invention is preferably made of low-alloy steel. In this respect, the piston ring of the present invention preferably has a matrix made of steel containing C, Si, Mn and Cr as indispensable alloy elements, and Mo, V and B as optional alloy elements; the composition of the indispensable alloy elements comprising by mass 0.45-0.65% of C, 0.15-0.35% of Si, 0.65-1.00% of Mn, and 0.60-1.10% of Cr; the composition of the optional alloy elements comprising by mass less than 0.35% of Mo, less than 0.25% of V, and less than 0.001% of B; and the total amount of the indispensable alloy elements and the optional alloy elements being less than 3.0% by mass. This steel is one proposed by the inventor in Japanese Patent Application No. 2014-10493, which can provide piston rings with good workability and excellent thermal conduction, because the total amount of the alloy elements is limited to less than 3.0% by mass. With the amount of Si reduced in the matrix, C precipitated as carbides by a heat treatment, and C remaining in crystal grains segregated to crystal grain boundaries (prior austenite crystal grain boundaries), the diffusion coefficient of nitrogen (N) is increased in crystal grains. This increases the depth of the nitride-diffused layer having desired hardness in the low-alloy steel, thereby providing a nitride layer having excellent wear resistance.

With C precipitated as carbides by a heat treatment, C as a solute is diluted in the matrix, and concentrated in crystal grain boundaries (austenite crystal grain boundaries), resulting in a smaller amount of C dissolved in crystal grains. As carbides, C is preferably precipitated in the form of spheroidal cementite by annealing. The annealing is conducted preferably at a temperature of 600-720° C. (equal to or lower than Ac1 in an Fe—C state diagram) for 30-240 minutes. This annealing is conducted preferably in the drawing and heat-treating steps (including patenting and oil-tempering) of the hot-rolled steel wire. To precipitate spheroidal cementite, the temperature and time of the oil-tempering should be set to avoid all carbides from being dissolved. The quenching step is preferably conducted after heating at a temperature of 820-980° C. for several tens of seconds to several minutes (for example, 30 seconds to 3 minutes), and the annealing step is preferably conducted at a temperature of 440-500° C. for several tens of seconds to several minutes (for example, 30 seconds to 3 minutes). A strain-removing heat treatment is conducted to avoid the deformation of a piston ring having strain introduced by forming (shaping). C is concentrated in crystal grain boundaries during this heat treatment, strengthening the grain boundaries with higher grain-boundary cohesive energy like B. The strain-removing heat treatment is conducted preferably at a high temperature, unless the matrix is largely softened. Specifically, it is preferably conducted at 420-480° C. C fixed as carbides is released by absorbing N in a subsequent nitriding step (carbonitride is converted to nitride), and the released C atoms are concentrated and aggregated in crystal grain boundaries, resulting in more C in crystal grain boundaries after nitriding.

When the steel is nitrided, a compound layer is formed on the outermost surface, but in the piston ring of the present invention, the compound layer is removed to turn the outermost surface of the nitride layer to a diffusion layer. When a phosphate chemical conversion coating described later remains, the outermost surface of the nitride layer in the present invention is a boundary between the nitride layer and the phosphate chemical conversion coating. In order that the nitride-diffused layer acts as a sliding surface having excellent wear resistance, it preferably has 30 μm or more of a diffusion layer having Vickers hardness of 700 HV0.05 or more, preferably 700-900 HV0.05, in addition to the above granular and/or vermicular surface forms. The thickness of the diffusion layer is more preferably 40 μm or more, further preferably 50 μm or more. The nitride layer is preferably homogeneous in a depth direction, with a depth-direction hardness reduction ratio of 3 HV0.05/μm or less in a range from the outermost surface to the depth of 30 μm. The hardness reduction ratio is more preferably 2 HV0.05/μm or less, further preferably 1 HV0.05/μm or less. To have as small a hardness reduction ratio as possible in a depth direction, the diffusion coefficient of nitrogen should be high in crystal grains.

In nitriding, attention should be paid to avoid the softening of the matrix. In the piston ring of the present invention, the matrix should have a predetermined hardness (for example, 400-500 HV1), and the level of the permitted softening is such that the hardness of the matrix is preferably 90-100%, more preferably 92-100%, further preferably 94-100%, of the hardness before nitriding. To suppress the softening of the matrix to the above extent, the nitriding temperature is preferably within ±30° C. of the annealing temperature.

In the piston ring of the present invention, the nitride layer is formed on at least one of upper and lower side surfaces. Of course, the nitride layer may be formed on the entire surface of the piston ring, but on the peripheral sliding surfaces, a hard coating of CrN, TiN, DLC, etc. may be formed with or without the nitride layer, depending on applications.

The production method of the piston ring of the present invention is characterized by nitriding at least one of upper and lower side surfaces of the piston ring formed from a steel wire, and further conducting a phosphate chemical conversion treatment. The nitriding may be not only gas nitriding, but also salt bath nitriding or plasma nitriding. To avoid the formation of a compound layer on the outermost surface, the plasma nitriding is preferable. On the nitrided side surfaces of the piston ring, the compound layer, if any on the outermost surface, is removed. After finely adjusted with respect to size, parallelism and surface roughness, a phosphate chemical conversion treatment is conducted. The phosphate chemical conversion treatment may be a zinc phosphate treatment, a zinc calcium phosphate treatment or a manganese phosphate treatment. In order that the nitride layer formed on the piston ring of the present invention has granular and/or vermicular surface forms of predetermined sizes, the zinc calcium phosphate treatment is preferable. To achieve the formation and growth of desired phosphate crystals, the treatment temperature, and the total acidity indicating the concentration of an agent are preferably adjusted as the conditions of the phosphate chemical conversion treatment. In the case of the zinc calcium phosphate treatment, the treatment temperature of 75-95° C. and the total acidity of 30-55 points are preferable.

EXAMPLE 1, AND COMPARATIVE EXAMPLES 1 AND 2

Steel having a composition comprising by mass 0.52% of C, 0.27% of Si, 0.81% of Mn, 0.95% of Cr, and 0.18% of V, the balance being Fe and inevitable impurities, was prepared by melting in a 10-kg vacuum induction furnace. It was formed into a wire having a diameter of 10 mm by hot working, and drawn to obtain a rectangular-cross-sectioned wire having a thickness of 2.3 mm and a width of 1.0 mm. An annealing step at 700° C. for 60 minutes was conducted in the course of the drawing step. Oil-tempering comprising oil-quenching from heating at 930° C. for 45 seconds to 60° C., and annealing at 470° C. for 60 seconds was conducted. 150 pressure rings each having a nominal diameter of 73 mm were formed from the above wire, and subjected to a strain-removing heat treatment at 450° C. for 60 minutes. A CrN coating was formed on the peripheral surface by ion plating.

Each of 100 pressure rings of Example 1 and Comparative Example 1 was provided with a nitride layer by gas nitriding on the upper and lower side surfaces and inner peripheral surface. The nitriding conditions were 500° C. and 180 minutes, and the hardness of the ring matrix was measured before nitriding. A compound layer on the outermost surface of the nitride layer was removed by grinding.

A zinc calcium phosphate chemical conversion treatment was conducted at a temperature of 85° C. and total acidity of 35 points for 5 hours, to form a zinc calcium phosphate coating on both upper and lower side surfaces and inner peripheral surface of each of 50 pressure rings of Example 1 and 50 nitride-layer-free pressure rings of Comparative Example 2.

[1] Measurement of Hardness of Nitride Layer

Each pressure ring of Example 1 and Comparative Example 1 was cut, mirror-polished on its cross section, and then measured with respect to the micro Vickers hardness (HV0.05) of the side-surface nitride layer in a range from a position of 20 μm from the boundary between the nitride-diffused layer and the chemical conversion coating (the outermost surface in Comparative Example 1) to the depth of 100 μm at intervals of 20 μm. Hardness reduction ratios between 20 μm and 40 μm and between 40 μm and 60 μm were calculated from the measured results. The results are shown in Table 1. Each matrix in Example 1 and Comparative Example 1 had hardness of 438 HV1 on average, 94.6% of the average hardness of 463 HV1 before nitriding.

TABLE 1

| No. | Hardness of Nitride Layer, HV0.05 (at the following depths from surface) | | | | | Hardness Reduction Ratio, HV0.05/μm | |
|---|---|---|---|---|---|---|---|
| | 20 μm | 40 μm | 60 μm | 80 μm | 100 μm | 20-40 μm | 40-60 μm |
| Example 1 | 791 | 773 | 738 | 692 | 592 | 0.9 | 1.75 |
| Com. Ex. 1 | 803 | 788 | 745 | 718 | 702 | 0.75 | 2.15 |

[2] Fatigue Strength Test

Figure 6:
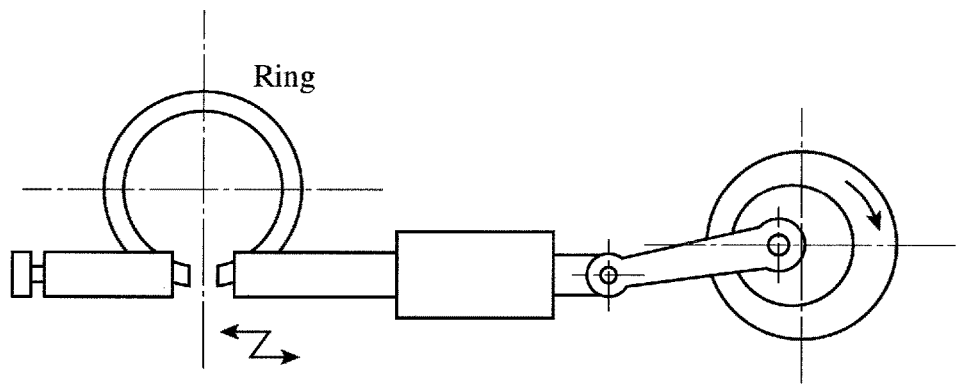
FIG. 6 is a view showing the operation mechanism of a ring fatigue test machine.

Considering the problem of a phosphate coating deteriorating the fatigue strength of a piston ring, which is pointed out in Patent Reference 2, a fatigue test was conducted by the ring fatigue test machine shown in FIG. 6, to investigate the influence of a phosphate coating formed on the nitride-diffused layer of the present invention on the fatigue strength. In the fatigue test, a piston ring with its free gap expanded by cutting off both gap end portions was set in the test machine in a state of being closed to the nominal diameter, and a stress was repeatedly given by an eccentric cam to the ring in a further closing direction, to measure the number of applications of stress until the ring was broken. The fatigue strength is defined as "the maximum stress at which breakage does not occur up to $10^7$ cycles in an S—N diagram," which is a sum of the stress ($f_2$) when the ring is closed to the nominal diameter and the applied stress. The pressure rings of Example 1 and Comparative Examples 1 and 2 had $f_2$ of 307 MPa, and the fatigue strength was 980 MPa in Example 1, 985 MPa in Comparative Example 1, and 730 MPa in Comparative Example 2. Thus, the pressure ring (Example 1) subjected to the phosphate chemical conversion treatment on the nitride layer had fatigue strength on the same level as that of the pressure ring (Comparative Example 1) with no chemical conversion treatment, while the pressure ring (Comparative Example 2) subjected to the phosphate chemical conversion treatment without the nitride layer had about 25% lower fatigue strength.

[3] Engine Test

Using a 1.5-liter, 4-cylinder gasoline engine, which comprised as top rings the pressure rings of Example 1 in first and second cylinders, the pressure ring of Comparative Example 1 in a third cylinder, and the pressure ring of Comparative Example 2 in a fourth cylinder, the engine test was conducted for 300 hours under the predetermined conditions. Second rings and oil rings were those existing in this engine. The measurement results revealed that the average wear of the lower side surfaces of the top rings was 1.7 µm in Example 1, 14 µm in Comparative Example 1, and 1.0 µm in Comparative Example 2. The wear resistance of the top ring on the side surfaces extremely decreased even in the presence of the nitride layer when the phosphate chemical conversion treatment was not conducted, while excellent wear resistance was obtained by the phosphate chemical conversion treatment even when the nitride layer was not formed on the side surfaces of the piston ring.

FIGS. 1-3 show the lower side surface forms of the top rings after the engine test, which were observed by a scanning electron microscope (SEM). In Example 1 (FIG. 1) and Comparative Example 2 (FIG. 3), the nitride-diffused layers had relatively rough granular and/or vermicular surface forms, after zinc calcium phosphate crystals were worn off from the outermost surface. On the other hand, Comparative Example 1 (FIG. 2) having only a nitride layer had a smooth surface. In Example 1 and Comparative Example 2, the diameters of granular surface forms and the short diameters of vermicular surface forms were measured and averaged, resulting in 18 µm in Example 1, and 20 µm in Comparative Example 2. The maximum height Rz of the surface roughness curve was 3.4 µm in Example 1, and 4.8 µm in Comparative Example 2.

EXAMPLES 2 AND 3, AND COMPARATIVE EXAMPLE 3

The pressure rings of Examples 2 and 3 (total acidity: 40 points and 50 points, respectively) and Comparative Example 3 (total acidity: 60 points) were produced in the same manner as in Example 1, except that the total acidity in the zinc calcium phosphate chemical conversion treatment was changed between 40 points and 60 points.

EXAMPLES 4 AND 5, AND COMPARATIVE EXAMPLE 4

The pressure rings of Examples 4 and 5 (total acidity: 35 points and 20 points, respectively) and Comparative Example 4 (total acidity: 10 points) were produced in the same manner as in Example 1, except that the chemical conversion treatment was changed to a manganese phosphate chemical conversion treatment, with total acidity varied between 5 points and 35 points.

EXAMPLE 6

The pressure ring of Example 6 was produced in the same manner as in Example 1, except for using a steel wire having a composition comprising by mass 0.60% of C, 1.35% of Si, 0.70% of Mn, and 0.73% of Cr, the balance being Fe and inevitable impurities, and a rectangular cross section of 2.3 mm in thickness and 1.0 mm in width.

EXAMPLE 7

The pressure ring of Example 7 was produced in the same manner as in Example 1, except for using a steel wire having a composition comprising by mass 0.60% of C, 1.90% of Si, 0.70% of Mn, 0.85% of Cr, 0.10% of V, and 0.21% of Ni, the balance being Fe and inevitable impurities, and a rectangular cross section of 2.3 mm in thickness and 1.0 mm in width.

With respect to Examples 2-7 and Comparative Examples 3 and 4, the engine tests with each pressure ring of Examples 2-5 used in each cylinder, and those with each pressure ring of Examples 6 and 7 and Comparative Examples 3 and 4 used in each cylinder were conducted by the same engine as in Example 1 under the same conditions as in Example 1. After the test, each pressure ring was measured with respect to the wear of the lower side surface, the average diameter of granular and/or vermicular surface forms, and the maximum height Rz of a surface roughness curve. The results are shown in Table 2, together with those of Example 1 and Comparative Examples 1 and 2.

TABLE 2

| No. | Wear of Lower Side Surface (µm) | Average Diameter of Granular And Vermicular Surface Forms (µm) | Maximum Height Rz (µm) |
| --- | --- | --- | --- |
| Example 1 | 1.7 | 18 | 3.4 |
| Example 2 | 1.0 | 26 | 4.5 |
| Example 3 | 2.7 | 32 | 5.3 |
| Example 4 | 2.5 | 11 | 2.7 |
| Example 5 | 5 | 5 | 2.6 |
| Example 6 | 1.8 | 16 | 3.2 |
| Example 7 | 2.1 | 13 | 2.9 |
| Com. Ex. 1 | 15 | — | — |
| Com. Ex. 2 | 1.0 | 20 | 4.8 |
| Com. Ex. 3 | 11 | 42 | 6.4 |
| Com. Ex. 4 | 14 | 1.7 | 2.4 |

The above results indicate that even if a phosphate chemical conversion coating formed on a nitride layer on the upper and lower side surfaces of a piston ring is worn off in an initial stage of the engine operation, wearing can be suppressed as long as granular and/or vermicular surface forms of the nitride-diffused layer are in a proper size range. In view of the fact that wearing occurs by oil film shortage in the smooth surface form of Comparative Example 1 despite its high surface hardness, it is considered that the granular and/or vermicular surface forms exhibit an excellent lubricating function as oil reservoirs. However, the absence of the nitride layer is not included in the present invention, because it results in lower fatigue strength despite excellent wear resistance due to granular and/or vermicular surface forms. It is considered that the piston ring having a nitride layer has high fatigue strength because of residual compression stress on the surface.

With respect to Example 5 and Comparative Example 4, in which the manganese phosphate chemical conversion treatment was conducted, the scanning electron microscopic (SEM) photographs of the lower side surfaces of the top rings after the engine test are shown in FIGS. 4 and 5. FIGS. 4 and 5 show considerably smaller granular and vermicular surface forms, as compared with those subjected to the zinc calcium phosphate chemical conversion treatment. In view of this, it is preferable to use zinc calcium phosphate in the phosphate chemical conversion treatment.

Though slightly poorer nitridability was expected because of steel containing Si on the level of 1% by mass, Examples 6 and 7 sufficiently exhibited excellent wear resistance due to the existence of the granular and/or vermicular surface forms of the present invention.

What is claimed is:

1. A piston ring made of steel, which has a nitride layer formed on at least one of upper and lower side surfaces, said nitride layer having at least one of granular and vermicular surface forms, wherein
a surface roughness curve of said nitride layer has the maximum height Rz of 2.5-6 μm.

2. The piston ring according to claim 1, wherein the diameters of said granular surface forms and the short diameters of said vermicular surface forms are in a range of 3-40 μm on average.

3. The piston ring according to claim 1, wherein a phosphate chemical conversion coating is formed on said nitride layer.

4. The piston ring according to claim 3, wherein said phosphate chemical conversion coating is a zinc calcium phosphate coating.

5. The piston ring according to claim 1, wherein a matrix of said piston ring, on which said nitride layer is formed, is made of a steel comprising C, Si, Mn and Cr as indispensable alloy elements, and Mo, V and B as optional alloy elements; the composition of said indispensable alloy elements comprising by mass 0.45-0.65% of C, 0.15-0.35% of Si, 0.65-1.00% of Mn, and 0.60-1.10% of Cr; the composition of said optional alloy elements comprising by mass less than 0.35% of Mo, less than 0.25% of V, and less than 0.001% of B; and the total amount of said indispensable alloy elements and said optional alloy elements being less than 3.0% by mass.

6. The piston ring according to claim 5, wherein said nitride layer has hardness of 700 HV0.05 or more in a range from the outermost surface to the depth of 30 μm.

7. The piston ring according to claim 6, wherein said nitride layer has a hardness reduction ratio of 3 HV0.05/μm or less in a range from the outermost surface to the depth of 30 μm in a depth direction.

8. The piston ring according to claim 5, wherein the hardness of said matrix is 90-100% of the hardness before nitriding.

9. A piston ring made of steel, which has a nitride layer formed on at least one of upper and lower side surfaces, said nitride layer having at least one of granular and vermicular surface forms, wherein
a matrix of said piston ring, on which said nitride layer is formed, is made of a steel comprising C, Si, Mn and Cr as indispensable alloy elements, and Mo, V and B as optional alloy elements; the composition of said indispensable alloy elements comprising by mass 0.45-0.65% of C, 0.15-0.35% of Si, 0.65-1.00% of Mn, and 0.60-1.10% of Cr; the composition of said optional alloy elements comprising by mass less than 0.35% of Mo, less than 0.25% of V, and less than 0.001% of B; and the total amount of said indispensable alloy elements and said optional alloy elements being less than 3.0% by mass,
said nitride layer has hardness of 700 HV0.05 or more in a range from the outermost surface to the depth of 30 μm, and
said nitride layer has a hardness reduction ratio of 3 HV0.05/μm or less in a range from the outermost surface to the depth of 30 μm in a depth direction.

10. A piston ring made of steel, which has a nitride layer formed on at least one of upper and lower side surfaces, said nitride layer having at least one of granular and vermicular surface forms, wherein
a matrix of said piston ring, on which said nitride layer is formed, is made of a steel comprising C, Si, Mn and Cr as indispensable alloy elements, and Mo, V and B as optional alloy elements; the composition of said indispensable alloy elements comprising by mass 0.45-0.65% of C, 0.15-0.35% of Si, 0.65-1.00% of Mn, and 0.60-1.10% of Cr; the composition of said optional alloy elements comprising by mass less than 0.35% of Mo, less than 0.25% of V, and less than 0.001% of B; and the total amount of said indispensable alloy elements and said optional alloy elements being less than 3.0% by mass, and
the hardness of said matrix is 90-100% of the hardness before nitriding.

11. A method for producing the piston ring recited in any one of claims 1, 2, and 3-8, wherein after said piston ring is formed by a steel wire, at least one of upper and lower side surfaces of said piston ring is nitrided, and then subjected to a phosphate chemical conversion treatment.

12. The method for producing a piston ring according to claim 11, wherein said phosphate chemical conversion treatment is a zinc calcium phosphate treatment.

13. The method for producing a piston ring according to claim 12, wherein said zinc calcium phosphate treatment is conducted under the conditions of a treatment temperature of 75-95° C. and total acidity of 30-55 points.

* * * * *